…

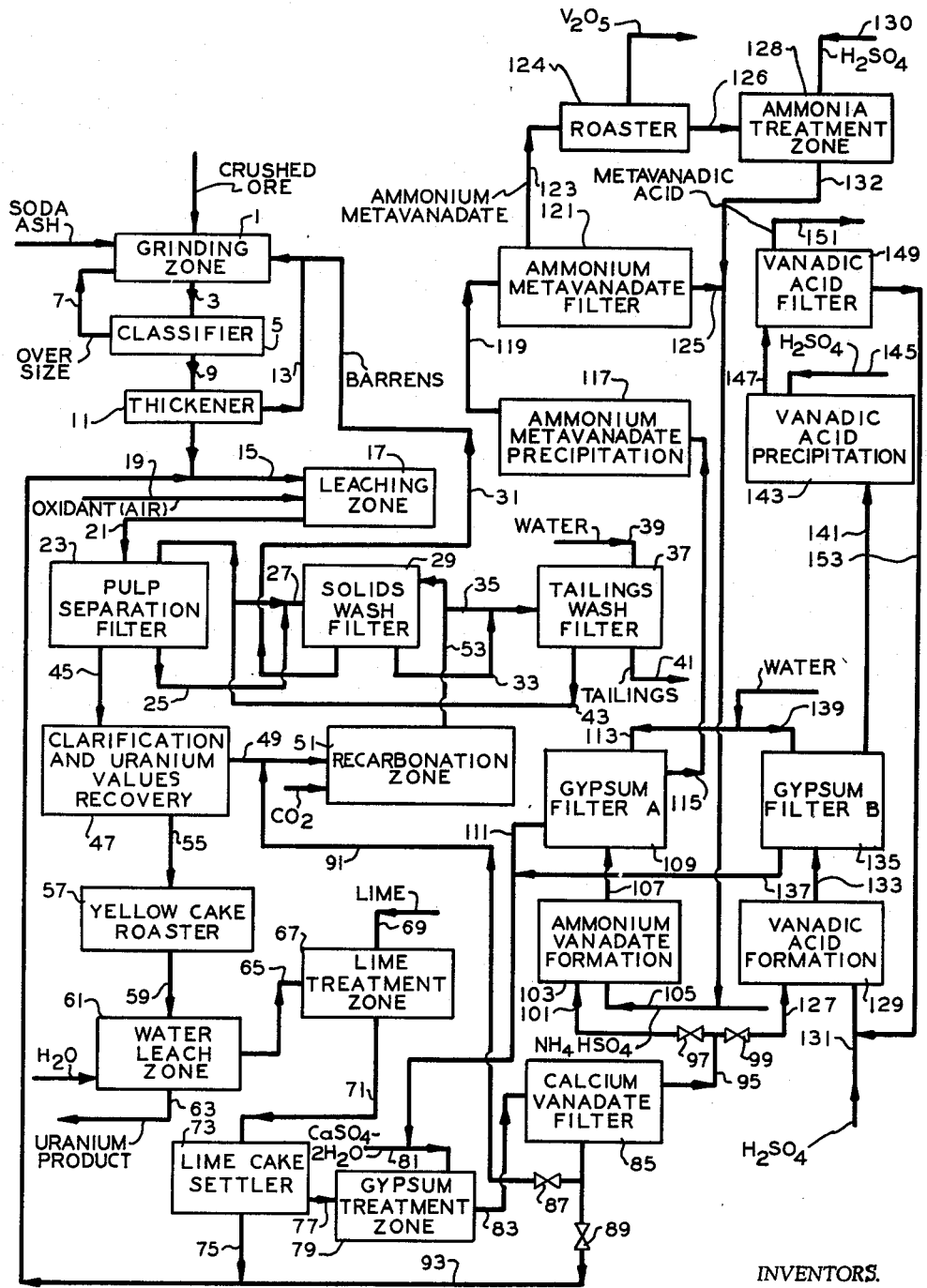

United States Patent Office 3,151,932
Patented Oct. 6, 1964

3,151,932
RECOVERY OF URANIUM AND VANADIUM VALUES
Robert E. Reusser and James L. Hart, Bartlesville, Okla., assignors to Phillips Petroleum Company, a corporation of Delaware
Filed Dec. 8, 1961, Ser. No. 157,933
13 Claims. (Cl. 23—14.5)

This invention relates to process for the recovery of uranium and vanadium values. In one aspect the invention relates to the recovery of uranium and vanadium from ore containing the same by the carbonate leaching process. In another aspect the invention relates to the purification of sodium diuranate (yellow cake) obtained by the carbonate leaching process. In a further aspect the invention relates to the recovery of vanadium from the aqueous solution obtained from the leaching of roasted yellow cake.

In the carbonate leaching process, crushed uranium-bearing ore is contacted with hot aqueous solutions of sodium carbonate and sodium bicarbonate under oxidizing conditions. Hexavalent uranium values are soluble in the leach solution, and tetravalent uranium values are oxidized to the hexavalent state during leaching. The pregnant solution, containing dissolved uranium values is then treated for the precipitation of sodium diuranate, commonly called yellow cake, by the addition of caustic.

Many of the uranium-bearing ores which are leached by the above described process also contain considerable quantities of vanadium. In fact, in many of these ores, the vanadium content is often double the uranium content. While these ores are not regarded as commercial sources of vanadium, the presence of vanadium in the ore presents several problems in the recovery of the uranium. While the vanadium in the ore is not nearly so soluble in the carbonate leach solution as the uranium, considerable quantities of vanadium are dissolved during the leaching step. The amount of vanadium leached will frequently run from 10 to 20 percent of the vanadium present in the ore. During the precipitation of yellow cake, a considerable quantity of the vanadium is coprecipitated with the uranium values and thus contaminates the yellow cake product. The Atomic Energy Commission, the major buyer of uranium concentrates, imposes a penalty if the vanadium content of the yellow cake exceeds a certain value.

Several processes have been proposed for the purification of yellow cake to remove vanadium and other impurities present therein. While the primary purpose of these processes is the manufacture of yellow cake of high purity, it would be advantageous if the vanadium values could be recovered in high purity. In copending application, 30,083 of R. E. Reusser, filed May 19, 1960, a process for the purification of yellow cake is described wherein the yellow cake is roasted with a sodium compound. The roasted yellow cake is then leached with water. The roasting process converts the uranium values in the yellow cake to an insoluble state, while the vanadium values are converted to a form which is soluble in the leach water. The aqueous solution from the leaching of the roasted yellow cake contains large quantities of vanadium values and only minor quantities of uranium. This "roast-quench solution" is thus available as a commercial source of vanadium.

Thus, it is an object of the invention to provide a process for recovering uranium and vanadium from materials containing these metals. Another object of the invention is to provide a process for the recovery of vanadium from an aqueous basic solution containing vanadium and carbonate ions. Another object of the invention is to provide a process for the recovery of vanadium values from roast-quench liquor.

Other aspects, objects and advantages of the invention will be apparent from a study of the disclosure, the drawing and the appended claims.

According to the process of this invention, vanadium values are recovered from roast-quench liquor by a process which comprises contacting said liquor with an amount of lime sufficient to precipitate the carbonate ions present in said liquor as calcium carbonate, separating said precipitated calcium carbonate, and contacting the remaining liquor with a sufficient amount of calcium sulfate to precipitate the vanadium values as calcium vanadate. The calcium vanadate is then treated with a sulfate-containing compound for the regeneration of calcium sulfate, said regenerated calcium sulfate being recycled to the vanadium precipitation step.

Actually, one could operate by using a sufficient quantity of lime in one step to effect both carbonate precipitation and vanadium precipitation, but in this case, the vanadium product would be contaminated with large quantities of calcium carbonate. If lime were used in two steps, a satisfactory precipitation of relatively pure calcium vanadate could be effected but one would not realize the economics of the calcium sulfate recycle as employed in the present invention. Surprisingly, calcium sulfate is not suitable for use in both precipitation steps unless sufficient hydroxyl ions are supplied during the calcium vanadate precipitation.

Thus, the invention contemplates the addition to the roast-quench liquor of (A) hydroxyl ions and (B) sufficient calcium ions to precipitate out the carbonate ions as calcium carbonate, (C) the separation out of the carbonate, (D) the addition of calcium sulfate to the remaining liquor to precipitate out the vanadium as calcium vanadate, (E) treating the calcium vanadate with a sulfate-containing compound for the regeneration of calcium sulfate, and (F) recycling the regenerated calcium sulfate to the vanadium precipitation. In a presently preferred embodiment, steps A and B are combined through the utilization of calcium oxide and/or calcium hydroxide.

In the first precipitation step wherein calcium carbonate is removed from roast-quench liquor by the addition of calcium ions, it is preferable to utilize approximately that amount of calcium ions required for theoretical precipitation of the carbonate ions present in the liquor, that is approximately one equivalent of calcium ions per equivalent of carbonte ions present. The addition of the calcium ions can be in the range of about 0.5 to about 0.8 pound per pound of carbonate ions present in the liquor. In a preferred embodiment wherein the liquor is obtained from leaching yellow cake which has been roasted with a sodium compound, the addition of calcium oxide can be in the range of about 0.4 to about 0.6 pound per pound of sodium carbonate present in the liquor, and preferably approximately about 0.53 pound per pound of sodium carbonate present in the liquor.

This precipitation step can be carried out at a temperature ranging from about 60° C. to about the boiling point of the roast-quench liquor at atmospheric pressure, which generally runs around 101° C. Preferably, the temperature is above about 85° C. The contacting of the lime with the roast-quench liquor is carried out by agitating the materials together for at least about 10 minutes, preferably above 20 minutes, and generally less than 30 minutes. The time employed will generally be dependent upon the temperature, that is, shorter times can be used at the boiling point than at 85° C.

After the calcium carbonate precipitate is separated from the remaining roast-quench liquor by a process such as filtration, sufficient gypsum (calcium sulfate) is added to precipitate the vanadium values as calcium vanadate. The amount of gypsum used should be at least 1.1 pounds per pound of $V_2O_5$ present, and an excess is preferred. For example, 2.5 to 5.0 pounds of gypsum per pound of $V_2O_5$ works very satisfactorily. The time and temperature conditions for the vanadate precipitation step will generally be the same as those for the carbonate precipitation step.

The calcium vanadate can be removed after precipitation by such separation means as filtration. The filtrate remaining can be returned to the uranium leaching zone for conservation of sodium ion.

The calcium vanadate is then treated with a sulfate-containing compound for the regeneration of usable gypsum. For example, the calcium vanadate precipitate, containing from 30 to 35 weight percent $V_2O_5$, can be contacted with sulfuric acid to form vanadic acid and insoluble calcium sulfate. The sulfuric acid can be an aqueous solution in the range of about 10 to about 50 percent. The addition of the sulfuric acid can be at a temperature in the range of about 30° C. to about 100° C. and for a time in the range of about 5 to about 20 minutes. The insoluble calcium sulfate is filtered out and recycled to the vanadate precipitation step, while the vanadic acid can be recovered by further acidification with sulfuric acid and heating to precipitate metavanadic acid. The metavanadic acid can be filtered out and roasted to $V_2O_5$, while the sulfuric acid-containing filtrate can be recycled for treatment of additional calcium vanadate. In the precipitation of metavanadic acid, it is desirable to heat the highly acidic solution to its boiling point to initiate precipitation.

In still another method of recovery, the calcium vanadate precipitate can be contacted with an aqueous solution of ammonium bisulfate to form ammonium metavanadate and insoluble gypsum. The temperature of the reaction can be in the range of about 90 to about 100° C. As in the other recovery method, the insoluble gypsum is filtered out and recycled to the calcium vanadate precipitation step. The hot ammonium metavanadate solution is then cooled to approximately 30° C. to cause precipitation of a large amount of the ammonium metavanadate. This product can then be filtered out, recycling the filtrate for contact with additional calcium vanadate. Ammonium metavanadate can be roasted to $V_2O_5$, said roasting step resulting in the evolution of ammonia. If a roasting step is used, the ammonia evolved can be reacted with sulfuric acid for the preparation of make-up ammonium bisulfate.

The process of this invention is best described by referring to the attached figure which is a schematic representation of a process in accordance with the invention. In this drawing, uranium ore is leached, and the leach solution is treated for recovery of uranium and vanadium values according to the process of this invention.

Referring now to the drawing, uranium-bearing ore and soda ash are charged to the grinding zone 1 wherein the ore is ground to a fine condition in the presence of water, sodium carbonate and sodium bicarbonate. The sodium bicarbonate is supplied as recarbonated barren liquor. An ore slurry leaves the grinding zone and passes through line 3 to classifier 5 wherein oversized particles are returned to the grinding zone via conduit 7, and the remaining fine ore slurry passes through line 9 to thickener 11. From the thickener, overflow is returned by conduit 13 to the grinding zone, while the thickened slurry passes through conduit 15 to leaching zone 17 wherein the oxidation and dissolution of uranium, vanadium and certain other materials in the ore takes place. The slurry is contacted with oxygen in the leaching zone by passing air into the zone via line 19. The slurry is maintained in the leaching zone for sufficient length of time at elevated temperatures to cause the uranium values to dissolve as sodium uranyl tricarbonate complex. The resulting solution, commonly referred to as pregnant liquor, leaves leaching zone 17 through conduit 21 to pulp separation filter 23. The pulp, principally composed of inert solids, passes through conduits 25 and 27 to solids wash filter 29. In this filter, the inert solids are washed with part of a recycled, recarbonated barren solution. The filtrate from this filter passes through conduit 31 back to the grinding zone 1. The solids (tailings) from filter 29 pass through conduit 33 and are combined with the balance of recarbonated barren solution from conduit 35 before passing into tailings wash filter 37. The tailings are washed in filter 37 with fresh water introduced through conduit 39 and are finally passed through conduit 41 to a tailings pond for disposal. The filtrate from the tailings wash filter is passed through conduit 43, part being used as feed to the spray of filter 23, the remainder being used to slurry the pulp in conduit 27.

The pregnant liquor filtrate from filter 23 passes through conduit 45 to clarification and uranium values recovery zone 47. In this zone, a series of steps is carried out including clarification of the pregnant liquor, precipitation of sodium diuranate by the addition of an excess of caustic, thickening, washing and drying of the yellow cake product. The barren solution from which the yellow cake product has been removed passes through conduit 49 to recarbonation zone 51 wherein it is recarbonated with flue gas or other $CO_2$-containing gas before being passed via conduit 53 to the filters. As described earlier, this recycle stream is divided, with approximately half being fed through conduit 53 to solids wash filter 29, the remainder being introduced through conduit 35 as feed to tailings wash filter 37.

The yellow cake product from uranium values recovery zone 47 is passed through conduit 55 to yellow cake roaster 57. In this roaster, the yellow cake is admixed with a compound such as sodium carbonate, and the resulting mixture is roasted at elevated temperatures for a finite length of time as described in more complete detail in the aforementioned Reusser application. The roasted yellow cake then passes via conduit 59 to water leach zone 61 wherein the vanadium values and a minor amount of the uranium values are dissolved out of the roasted yellow cake by contact with water. The undissolved uranium product is removed from this zone via line 63. This pure uranium product is available as is for sale to the Atomic Energy Commission or other buyers of uranium concentrates. The aqueous solution from zone 61, basic in nature and containing considerable quantities of dissolved carbonate and vanadium, pass through conduit 65 to lime treatment zone 67. Simultaneously 0.53 pound of lime per pound of carbonate in the solution in conduit 65 is admitted to zone 67 through conduit 69. After agitating the mixture in zone 69 at 90° C. for 20 minutes, the resulting slurry passes through conduit 71 to lime cake settler 73. In this settler, the precipitated calcium carbonate is settled out. This precipitated material also contains approximately 17 percent of the vanadium values and approximately 80 percent of the uranium values in the roast-quench liquor, so this material is recycled via line 75 to conduit 15 for recycling to the uranium leach zone 17. The filtrate passes via line 77 to gypsum treatment zone 79. Simultaneously, 3 pounds of gypsum per pound of $V_2O_5$ in the filtrate from 73 is introduced via conduit 81 to treatment zone 79. After 20 minutes at 90° C. in this zone, the resulting slurry is withdrawn from treatment zone 79 via conduit 83 to calcium vanadate filter 85. The precipitated calcium vanadate is filtered out, while the remainder of the liquor is recycled for use in the uranium leaching process. Alternatively, with valve 87 open and valve 89 closed, the liquor is recycled via conduit 91 for recarbonation. With valve 87 closed and valve 89 open, the liquor is recycled via conduits 93 and 75 to conduit 15 for direct recycle to the leaching zone without recarbonation.

The solid calcium vanadate from filter 85 can then be treated by either or both of two methods. In one method of operation, the calcium vanadate passes through conduit 95, open valve 97 (valve 99 being closed) and conduit 101 to ammonium vanadate formation zone 103. Simultaneously, ammonium bisulfate is charged to zone 103 via conduit 105. In zone 103, the ammonium bisulfate (in aqueous solution) is contacted with the calcium vanadate at 90° C. for 15 to 20 minutes. The resulting mixture is withdrawn through conduit 107 to gypsum filter A 109. The calcium sulfate formed is filtered out in zone 109 and recycled via conduits 111 and 81 to gypsum treatment zone 79. This provides an economy in calcium sulfate which can not be achieved by the use of lime in the second precipitation step. Wash water for filter 109 is provided via conduit 113. The solution of ammonium metavanadate is withdrawn through conduit 115 to ammonium metavanadate precipitation zone 117. In this zone, the solution is cooled to approximately 30° C., thus effecting the precipitation of the major portion of the dissolved ammonium metavanadate. The slurry then passes from zone 117 through conduit 119 to ammonium metavanadate filter 121. The ammonium metavanadate product is withdrawn through conduit 123, and this product can be treated further, for example by roasting to $V_2O_5$ in roasting zone 124, resulting in the evolution of ammonia. The ammonia can be removed from roasting zone 124 through line 126 to treating zone 128 wherein the ammonia is reacted with sulfuric acid added by line 130 for the preparation of make-up ammonium bisulfate. The ammonium bisulfate can be passed through line 132 and line 105 to zone 103. The filtrate, ammonium bisulfate solution containing some dissolved ammonium metavanadate, is recycled via conduits 125 and 105 to zone 103. By operating in this manner, conservation of ammonium bisulfate is effected.

Alternatively, with valve 97 closed and valve 99 open, calcium vanadate passes via conduits 95 and 127 to vanadic acid formation zone 129. Simultaneously, aqueous sulfuric acid is introduced to zone 129 through conduit 131. The resultant mixture is passed via conduit 133 to gypsum filter B 135. The insoluble calcium sulfate formed is removed in zone 135 and recycled via conduits 137 and 111 to zone 79. Wash water for filter B is supplied via conduit 139. The filtrate from filter 135, a solution of vanadic acid, passes via conduit 141 to vanadic acid precipitation zone 143. Simultaneously, additional sulfuric acid, if needed, is supplied to zone 143 via conduit 145. In this zone, the highly acidic solution is heated to its boiling point to effect precipitation of metavanadic acid. The resulting slurry then passes via conduit 147 to vanadic acid filter 149. Solid metavanadic acid product is withdrawn through conduit 151. The filtrate is then recycled through lines 153 and 131 to zones 129 for conservation of sulfuric acid. As in the case of ammonium metavanadate product, metavanadic acid can be roasted to $V_2O_5$ if desired.

It is to be recognized that the conversion of calcium vanadate to ammonium metavanadate and metavanadic acid can be carried out simultaneously by operating both of the units in parallel. The equipment required for each of these trains is essentially the same, and either method of operation could be carried out in the same equipment at separate times.

The following specific examples are intended to illustrate the advantages of the present invention, but it is not intended that the invention be limited to the specific embodiments shown therein.

EXAMPLE I

A series of runs were carried out in which vanadium-containing solutions were treated with calcium compounds to effect precipitation of calcium vanadate.

In each of these runs either 50 ml. or 500 ml. of quench solution from the water leaching of roasted yellow cake was used, said solution containing 9.60 grams per liter of $V_2O_5$ and having a pH of approximately 11.9. The calcium compound was added as a solid to the quench solution, and the resulting mixture was then heated to boiling and maintained at this temperature for 2 to 3 minutes. The solutions were then poured into stock bottles and stored for several days, after which the solutions were analyzed. The results of these runs are expressed below as Table I.

*Table I*

| Calcium compound added | Volume $V_2O_5$ solution, ml. | Grams calcium compound | Grams Calcium compound/ gram $V_2O_5$ | Percent $V_2O_5$ removed |
|---|---|---|---|---|
| $CaCl_2$ | 50 | 2.5 | 5.2 | 74.48 |
| $CaCl_2$ | 50 | 2.5 | 5.2 | [1] 7.29 |
| CaO | 500 | 48.0 | 10.0 | 100 |
| $CaSO_4$ | 500 | 48.0 | 10.0 | 39.6 |

[1] The pH of the $V_2O_5$ solution used in this run was 2.9.

EXAMPLE II

A series of runs was carried out in which various amounts of CaO were added to 500 ml. of a solution from the water leaching of roasted yellow cake. This "roast-quench" solution contained 26.89 g./l. of $Na_2CO_3$, 2.00 g./l. of NaOH, 53.13 g./l. of $Na_2SO_4$, 9.60 g./l. of $V_2O_5$ and 0.17 g./l of $U_3O_8$. The pH of this solution was approximately 11.9.

In each of these runs, the desired amount of CaO was added as a powder to the solution, after which the mixture was heated to 101° C. for 20 minutes. The precipitate was then filtered out, and the filtrate was analyzed. The results of these tests are expressed below as Table II.

*Table II*

| Grams CaO added | Wt. ratio, $CaO/V_2O_5$ | Analysis of filtrate | | | | | Percent $V_2O_5$ removed |
|---|---|---|---|---|---|---|---|
| | | $Na_2CO_3$, g./l. | NaOH, g./l. | $V_2O_5$, g./l. | $Na_2SO_4$, g./l. | $U_3O_8$, g./l. | |
| 7.0 | 1.46 | 7.45 | 17.69 | 4.25 | 52.76 | <0.05 | 55.7 |
| 12.0 | 2.5 | 1.54 | 23.47 | 0.05 | 51.71 | <0.05 | 99.48 |
| 24.0 | 5.0 | 1.53 | 23.72 | 0.05 | 52.09 | <0.05 | 99.48 |
| 36.0 | 7.5 | 1.53 | 24.22 | 0.05 | 53.62 | <0.05 | 99.48 |
| 48.0 | 10.0 | 1.53 | 24.46 | 0.05 | 53.31 | <0.05 | 99.48 |

EXAMPLE III

A run was carried out in which the theoretical amount of CaO necessary to react with all of the carbonate ion and all of $V_2O_5$ present in roast-quench liquor was added in incremental amounts. The roast-quench liquor used was identical to that employed in the previous examples.

In this run, 650 ml. of the roast-quench liquor, containing 26.89 g./l. $Na_2CO_3$ and 9.60 g./l. $V_2O_5$, was treated with powdered CaO. The addition of CaO was made at 30° C. and incremental portions of the CaO were added at 10 minute intervals. After all of the CaO had been added, the solution was maintained at 30° C. until 3 hours had elapsed from the beginning of the run. The temperature was then raised and maintained at successively higher levels for 30 minute periods. Samples of the mixture were removed after each interval, filtered and analyzed. The results of these runs are expressed below as Table III.

*Table III*

| Temperature °C. | Time after beginning of run, minutes | Grams CaO added | Wt. ratio, CaO/V$_2$O$_5$ | Analysis | | | |
|---|---|---|---|---|---|---|---|
| | | | | V$_2$O$_5$, g./l. | Na$_2$CO$_3$, g./l. | U$_3$O$_8$, g./l. | Percent V$_2$O$_5$ removed |
| 30 | 10 | 4.60 | 0.787 | 8.95 | 26.28 | 0.19 | 6.77 |
| 30 | 20 | 4.65 | 1.48 | 8.90 | 25.19 | 0.16 | 7.29 |
| 30 | 30 | 4.26 | 2.16 | 8.90 | 24.31 | 0.13 | 7.29 |
| 30 | 40 | 1.51 | 2.41 | 8.90 | 24.31 | 0.11 | 7.29 |
| 30 | 180 | ---- | 2.41 | 8.75 | 23.87 | 0.08 | 8.85 |
| 60 | 210 | ---- | 2.41 | 6.60 | 12.05 | <0.05 | 31.25 |
| 85 | 240 | ---- | 2.41 | 0.02 | 1.31 | <0.05 | 99.79 |
| 101 | 270 | ---- | 2.41 | 0.01 | 1.53 | <0.05 | 99.89 |

At the completion of the run, the solution was filtered, the filtrate was discarded, and the precipitate was washed three times with 50 ml. water each time. The residue was then dried overnight and analyzed. This residue analyzed 19.34 weight percent V$_2$O$_5$.

EXAMPLE IV

In two other series of runs, the theoretical amount of lime necessary to precipitate the carbonate ion and the vanadate ion from roast-quench liquor was added to the liquor, and the resulting mixture was maintained at an elevated temperature for varying periods of time.

In the first series, 10.50 grams of CaO was added to 700 ml. of roast-quench liquor containing 7.38 g./l. V$_2$O$_5$ and 13.84 g./l. Na$_2$CO$_3$. The mixture was maintained at 75° C. for 10 minutes, after which a sample was withdrawn and anlyzed. The mixture was then heated to 90° C., and after 10 minutes a second analysis sample was withdrawn. Another sample was withdrawn after another 20 minutes. The results are tabulated below.

| Temperature, °C. | Time, minutes | V$_2$O$_5$, g./l. | Percent V$_2$O$_5$ removed |
|---|---|---|---|
| 75 | 10 | 5.50 | 25.2 |
| 90 | 10 | 5.50 | 25.2 |
| 90 | 20 | 0.02 | 99.73 |

In the second series of tests the same amount of CaO was added to the same amount of identical roast-quench liquor. The mixture was maintained at 75° C. and samples were withdrawn and analyzed at various intervals. The results of this series are tabulated below.

| Temperature, °C. | Time, minutes | V$_2$O$_5$, g./l. | Percent V$_2$O$_5$ removed |
|---|---|---|---|
| 75 | 10 | 5.70 | 22.6 |
| 75 | 20 | 5.35 | 27.4 |
| 75 | 30 | 5.35 | 27.4 |
| 75 | 45 | 5.15 | 30.1 |
| 75 | 60 | 5.00 | 32.2 |
| 75 | 75 | 4.15 | 43.6 |

EXAMPLE V

In another run, CaO was employed to neutralize the Na$_2$CO$_3$ in roast-quench solution, and the calcium ion necessary to precipitate the vanadium as calcium vanadate was supplied as calcium sulfate.

In this run, 800 ml. of a roast-quench solution of 11.9 pH and containing 7.38 g./l. V$_2$O$_5$, 13.84 g./l. Na$_2$CO$_3$ and 2.61 g./l. NaOH was charged to a flask and heated to its boiling point 101° C. To this solution was then added 6.00 grams of CaO and the mixture was maintained at 101° C. for 20 minutes. A sample of the mixture was withdrawn, filtered, and analyzed for V$_2$O$_5$ content. To the remainder of the mixture was added 15.20 grams CaSO$_4$·½H$_2$O. This amount represents 10 percent excess of the theoretical amount as calculated for precipitation of vanadium ion as calcium vanadate. The mixture was allowed to react for 20 minutes at 101° C., after which the mixture was filtered and analyzed. The results of this run are tabulated below.

| | Before lime addition | After lime addition | After gypsum addition |
|---|---|---|---|
| Na$_2$CO$_3$, g./l. | 13.84 | 2.45 | 0.87 |
| NaOH, g./l. | 2.61 | 5.90 | 4.13 |
| U$_3$O$_8$, g./l. | 0.14 | <0.05 | <0.05 |
| V$_2$O$_5$, g./l. | 7.38 | 4.65 | 0.002 |
| Percent V$_2$O$_5$ removed | | 37 | 99.97 |

EXAMPLE VI

For comparison, it was attempted to precipitate calcium vanadate from vanadium-containing solutions by the use of calcium sulfate alone.

In this run, 800 ml. of a roast-quench solution (pH=11.2), containing 13.84 g./l. Na$_2$CO$_3$ and 7.17 g./l. V$_2$O$_5$ was heated to 90° C. and 18.42 grams of $$CaSO_4 \cdot 2H_2O$$

was added. After 20 minutes, a sample was withdrawn, cooled and filtered. The filtrate analyzed 0.00 g./l. Na$_2$CO$_3$ and 5.00 g./l. V$_2$O$_5$. This indicates 30.27 percent of the V$_2$O$_5$ was removed.

The mixture was then treated with an additional 18.03 grams of CaSO$_4$·2H$_2$O at 90° C. for 20 minutes. A sample was again withdrawn, cooled and filtered. The filtrate (A) analyzed 4.70 g./l. V$_2$O$_5$, indicating that 34.45 percent of the V$_2$O$_5$ had been removed.

Three hundred milliliters of this solution (A) was then heated to 90° C. and contacted with three grams CaO for 20 minutes. The filtrate analyzed 0.27 V$_2$O$_5$, or 96.58 percent of the V$_2$O$_5$ had been removed.

Another 265 ml. of the A solution was treated at room temperature with 15.2 ml. of 25 percent aqueous NaOH, causing the precipitation of Ca(OH)$_2$. The filtrate (4.20 g./l. V$_2$O$_5$) was then treated with 5.41 grams of CaSO$_4$ at 90° C. for 20 minutes, and the filtrate analyzed 0.01 g./l. V$_2$O$_5$. This indicates essentially 100 percent removal of V$_2$O$_5$, and further indicates that CaSO$_4$ will effect V$_2$O$_5$ removal when used alone only if sufficient hydroxyl ion is present.

EXAMPLE VII

A series of runs was carried out in which calcium vanadate was treated with several different ammonium compounds to form ammonium metavanadate.

The calcium vanadate used in these runs was a composite from the preceding runs wherein calcium vanadate was precipitated from roast-quench liquor by the addition of lime. This composite analyzed 25.67 weight percent V$_2$O$_5$.

In one test, 5.31 grams of (NH$_4$)$_2$CO$_3$ in 50 ml. of water was added to 10 grams of the composite, and the resulting mixture was heated to 90° C. and maintained at this temperature for 10 minutes. The solution was then filtered hot, and the filtrate was analyzed. The filtrate contained 47.35 g./l. $V_2O_5$, and after standing for 24 hours, the filtrate analysis was 19.25 g./l. $V_2O_5$. After standing another 24 hours, the filtrate analyzed 18.65 g./l. $V_2O_5$.

The residue from the initial leach analyzed 1.86 percent $V_2O_5$ and amounted to 9.02 grams.

In another test, 10 grams of the composite calcium vanadate was added to a solution of 3.69 grams of $NH_4HCO_3$ in 50 ml. of water. The solution was heated to 90° C. for 10 minutes, filtered hot and then cooled. The filtrate amounted to 32 ml. and contained 39.03 g./l. $V_2O_5$. After standing, sufficient ammonium vanadate had precipitated that the filtrate analyzed 19.75 g./l. $V_2O_5$. The residue from the leach analyzed 15.40 weight percent $V_2O_5$.

In another test, 15 grams of the composite was added to a solution containing 9.23 grams of $(NH_4)_2SO_4$ in 60 ml. of water. The solution was heated to 90° C. for 10 minutes, filtered hot and then allowed to stand for formation of ammonium vanadate. The filtrate amounted to 43 ml. and analyzed 25.40 g./l. $V_2O_5$. The residue analyzed 12.19 weight percent $V_2O_5$.

In still another test, 15 grams of the composite calcium vanadate was added to a solution containing 16.13 grams of $NH_4HSO_4$ in 60 ml. water. The solution was heated to 90° C. for 10 minutes, filtered hot and analyzed. Immediately on cooling, a white solid began precipitating out. The analysis of the filtrate (34 ml.) immediately after filtering showed 41.15 g./l. $V_2O_5$ present. After standing three hours, 25 ml. of the filtrate contained 1.84 g./l. $V_2O_5$. The white precipitate was repulped three times in 10 ml. of water, and 1.72 grams of this material contained 74.05 weight percent $V_2O_5$. This material, after heating to 500° C. for one hour analyzed 88.42 weight percent $V_2O_5$, and after heating one hour at 700° C., analyzed 97.23 weight percent $V_2O_5$. The residue from the initial filtration analyzed 16.31 weight percent $V_2O_5$.

Another test was carried out in which calcium vanadate was treated with $NH_4HSO_4$. In this test, 15 grams of composite calcium vanadate containing 25.67 weight percent $V_2O_5$ was added to a solution of 16.13 grams of $NH_4HSO_4$ in 60 ml. water. The solution was heated to 60° C. and the calcium vanadate was added slowly to the solution while stirring. The mixture turned orange, and when heated further, ammonia was given off. The mixture turned white, and wash water was added to dilute the mixture. The mixture was then heated to 90° C. and filtered hot. A white precipitate began forming in the filtrate about 10 minutes after filtration. The filtrate amounted to 57 ml. and contained 41.10 g./l. $V_2O_5$. After standing over a weekend, the filtrate was again filtered to remove the white solid which had formed. The filtrate from this filtration amounted to 44 ml. and analyzed 1.14 g./l. $V_2O_5$. The white precipitate after washing and drying, amounted to 1.98 grams and contained 75.49 percent $V_2O_5$. X-ray diffraction indicated this material was a metavanadate.

EXAMPLE VIII

A run was carried out in which the calcium vanadate from the lime treatment of roast-quench liquor was converted to metavanadic acid (red cake).

Twenty grams of calcium vanadate (32.83 weight percent $V_2O_5$) was added to a solution of 25 grams of $Na_2CO_3$ in 100 ml. of water. The mixture was heated to 90 to 95° C. for 30 minutes, cooled, and filtered after standing about two hours. The filtrate contained 59.69 g./l. $V_2O_5$, while the residue amounted to 17.90 grams and contained 4.00 weight percent $V_2O_5$.

Seventy-five ml. of the filtrate was acidified to a pH of 2.0 by the addition of 6.1 grams of concentrated $H_2SO_4$. Before addition of the acid, the solution was heated to 70° C. and 0.5 grams of $KClO_3$ was added. After the acid addition, the mixture was heated to 90 to 95° C. for two hours and allowed to cool by standing for one hour. The red cake which precipitated amounted to 5.11 grams. After pulping in water and drying, the material contained 83.64 weight percent $V_2O_5$. The filtrate amounted to 59 ml. and contained 0.20 g./l. $V_2O_5$.

Various modifications and alterations of the invention without departing from the scope and concept of the invention will be apparent to those skilled in the art, and the foregoing description and examples are for the purpose of illustration and are not to be construed so as to unduly limit the invention.

We claim:

1. A process for the recovery of the vanadium values from a basic aqueous solution containing vanadium values and carbonate ions comprising contacting said solution in the presence of hydroxyl ions with an amount of calcium ions sufficient to provide approximately an equivalent of calcium ions per equivalent of carbonate ions present in said solution at a temperature in the range of about 60° C. to the boiling point of the resulting mixture at atmospheric pressure for a time in the range of about 10 to about 30 minutes to precipitate calcium carbonate, filtering the resulting mixture to separate out the precipitated calcium carbonate, contacting the filtrate with at least 1.1 pounds of calcium sulfate per pound of $V_2O_5$ present in the filtrate at a temperature in the range of about 60° C. to the boiling point of the resulting mixture at atmospheric pressure for a time in the range of about 10 to about 30 minutes to precipitate the vanadium values as calcium vanadate, treating the calcium vanadate thus obtained with an aqueous solution of a suitable sulfate-containing compound to regenerate calcium sulfate, and recycling the regenerated calcium sulfate to the vanadium precipitation step.

2. A process according to claim 1 wherein said step of treating the calcium vanadate with a sulfate-containing compound comprises contacting said calcium vanadate with an aqueous solution of sulfuric acid in the range of about 10 to 50 percent at a temperature in the range of about 30 to about 100° C., and for a time in the range of about 5 to about 20 minutes to form vanadic acid and regenerated insoluble calcium sulfate, and filtering out said regenerated calcium sulfate.

3. A process according to claim 2 further comprising recovering said vanadic acid, contacting said vanadic acid with sulfuric acid, heating the thus obtained solution to precipitate metavanadic acid, filtering out said metavanadic acid, and roasting the thus obtained metavanadic acid to obtain $V_2O_5$.

4. A process according to claim 3 further comprising recycling the sulfuric acid-containing filtrate to the step of treating additional calcium vanadate.

5. A process according to claim 1 wherein said step of treating the calcium vanadate with a sulfate-containing compound comprises contacting said calcium vanadate with an aqueous solution of ammonium bisulfate at a temperature in the range of about 90 to about 100° C. to form ammonium metavanadate and regenerated insoluble calcium sulfate, and filtering out said regenerated calcium sulfate.

6. A process according to claim 5 further comprising cooling said ammonium metavanadate filtrate to approximately 30° C. to cause precipitation of a large amount of the ammonium metavanadate, filtering out the ammonium metavanadate, recycling the filtrate for contact with additional calcium vanadate, and roasting said ammonium metavanadate to obtain $V_2O_5$ and ammonia.

7. A process according to claim 6 further comprising reacting the thus evolved ammonia with sulfuric acid for the preparation of make-up ammonium bisulfate, and recycling the thus obtained ammonium bisulfate to the step of contacting the calcium vanadate.

8. A process according to claim 1 wherein the contacting of said solution with calcium ions is carried out by adding to said solution calcium oxide in an amount to provide calcium ions in an amount in the range of about .5 to about .8 pound per pound of carbonate ions present in said solution at a temperature in the range of about 85° C. to about 101° C. for a time in the range of about 20 to about 30 minutes.

9. A process according to claim 1 wherein the contacting of said filtrate with calcium sulfate is carried out by adding to said filtrate calcium sulfate in an amount in the range of about 2.5 to about 5.0 pounds per pound of $V_2O_5$ present in said filtrate at a temperature in the range of about 85° C. to about 101° C. for a time in the range of about 20 to about 30 minutes.

10. A process according to claim 8 wherein the contacting of said filtrate with calcium sulfate is carried out by adding to said filtrate calcium sulfate in an amount in the range of about 2.5 to about 5.0 pounds per pound of $V_2O_5$ present in said filtrate at a temperature in the range of about 85° C. to about 101° C. for a time in the range of about 20 to about 30 minutes.

11. A process for the recovery of vanadium values from a basic aqueous solution containing vanadium values and carbonate ions comprising, contacting said solution with a caustic to provide hydroxy ions, adding to the resulting mixture an amount of calcium sulfate sufficient to precipitate calcium carbonate, separating out said calcium carbonate, adding an additional amount of calcium sulfate to precipitate the vanadium values as calcium vanadate, treating the calcium vanadate with an aqueous solution of a suitable sulfate-containing compound to regenerate calcium sulfate, and recycling the regenerated calcium sulfate.

12. A process for the recovery of vanadium values from a basic aqueous solution containing vanadium values and carbonate ions comprising contacting said solution with an amount of calcium oxide sufficient to precipitate the carbonate ions present in said solution as calcium carbonate, separating the precipitated calcium carbonate, contacting the remaining solution with a sufficient amount of calcium sulfate to precipitate the vanadium values as calcium vanadate, treating the calcium vanadate with an aqueous solution of a suitable sulfate-containing compound to regenerate calcium sulfate, and recycling the regenerated calcium sulfate to the vanadium precipitation step.

13. A process of recovering uranium and vanadium from ore containing the same comprising, crushing said ore in the presence of water, sodium carbonate and sodium bicarbonate to form a slurry, passing said slurry to a leaching zone and therein contacting said slurry with an oxygen containing gas, removing the leaching liquor from said leaching zone, filtering said leaching liquor to separate solids therefrom, treating the leaching liquor filtrate with an excess of caustic to precipitate sodium diuranate, separating out said sodium diuranate, roasting said sodium diuranate with a sodium compound to form a substantially insoluble uranium product, leaching said uranium product with water, recovering the leaching solution from the leaching of said uranium product, said solution containing carbonate ions, contacting said solution with an amount of calcium oxide sufficient to precipitate the carbonate ions present in said solution as calcium carbonate, separating the precipitated calcium carbonate, recycling the calcium carbonate precipitate to said leaching zone, contacting the remaining solution with a sufficient amount of calcium sulfate to precipitate the vanadium values as calcium vanadate, filtering out said calcium vanadate, recycling at least a part of the thus obtained filtrate to said leaching zone, treating the calcium vanadate thus obtained with an aqueous solution of a suitable acidic sulfate-containing compound to regenerate calcium sulfate, and recycling the regenerated calcium sulfate to the vanadium precipitation step.

References Cited in the file of this patent

UNITED STATES PATENTS

| 2,950,951 | Sherk | Aug. 30, 1960 |
| 2,979,378 | Koble | Apr. 11, 1961 |
| 3,022,135 | Hart | Feb. 20, 1962 |

OTHER REFERENCES

Butler: Engineering and Mining Journal, vol. 152, No. 3, pp. 56–62.